(12) United States Patent
Wang et al.

(10) Patent No.: US 12,092,558 B1
(45) Date of Patent: Sep. 17, 2024

(54) GAS BASED TESTING METHOD FOR PORE VOLUME COMPRESSIBILITY OF LOW-PERMEABILITY ROCK

(71) Applicant: SOUTHWEST PETROLEUM UNIVERSITY, Chengdu (CN)

(72) Inventors: Zhouhua Wang, Chengdu (CN); Hanmin Tu, Chengdu (CN); Xintong Zhang, Chengdu (CN); Ping Guo, Chengdu (CN); Shuoshi Wang, Chengdu (CN); Huang Liu, Chengdu (CN); Zhicheng Yang, Chengdu (CN); Xingliang Deng, Chengdu (CN); Zhiliang Liu, Chengdu (CN); Yisheng Hu, Chengdu (CN); Hongnan Yang, Chengdu (CN); Ping Le, Chengdu (CN); Tongwen Jiang, Chengdu (CN); Guangya Zhu, Chengdu (CN); Nan Li, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 18/678,292

(22) Filed: May 30, 2024

(30) Foreign Application Priority Data

Mar. 19, 2024 (CN) .......................... 202410310168.6

(51) Int. Cl.
*G01N 15/08* (2006.01)
*E21B 49/08* (2006.01)

(52) U.S. Cl.
CPC ....... *G01N 15/0826* (2013.01); *E21B 49/087* (2013.01); *G01N 2203/0044* (2013.01)

(58) Field of Classification Search
CPC .............. G01N 15/08; G01N 15/0826; G01N 2203/0044
See application file for complete search history.

(56) References Cited

U.S. PATENT DOCUMENTS

2004/0211252 A1* 10/2004 Lenormand ........ G01N 15/0826
73/152.05
2017/0167964 A1* 6/2017 Liu ......................... G01N 33/24
(Continued)

FOREIGN PATENT DOCUMENTS

| CN | 104374683 B | 2/2015 |
| CN | 114076716 A | 2/2022 |

*Primary Examiner* — Eric S. McCall
(74) *Attorney, Agent, or Firm* — Birchwood IP

(57) ABSTRACT

The present invention discloses a gas based testing method for a pore volume compressibility of a low-permeability rock. The method comprises the following steps: obtaining a compressibility and an isothermal adsorption-desorption curve of experimental gas under a reservoir condition; performing a physical simulation experiment by using a steel core drilled with a through hole, and obtaining a gas volume collected due to the deformation of an experimental instrument; then repeating the experiment by using an actual core with the same size, and obtaining pore volumes of the reservoir core under the experimental conditions by deducting deformation of the instrument; and finally, obtaining a pore compressibility of the reservoir core under different reservoir conditions according to the pore volumes of the reservoir core under different reservoir conditions. The present invention considers gas adsorption, corrects errors caused by deformation of a physical simulation device.

9 Claims, 2 Drawing Sheets

(56) References Cited

U.S. PATENT DOCUMENTS

2019/0265138 A1\* 8/2019 Ma ............................ G01N 3/10
2020/0263511 A1\* 8/2020 Sang ........................ E21C 41/18

\* cited by examiner

GAS BASED TESTING METHOD FOR PORE VOLUME COMPRESSIBILITY OF LOW-PERMEABILITY ROCK

CROSS-REFERENCE TO RELATED APPLICATIONS

This application claims priority to Chinese Patent Application No. 202311582311.9, filed on Mar. 19, 2024, which is hereby incorporated by reference in its entirety.

TECHNICAL FIELD

The present invention relates to the technical field of oil and gas field development, and specifically to a gas based testing method for a pore volume compressibility of a low-permeability rock.

BACKGROUND

A rock pore volume compressibility is an important parameter in reservoir engineering research (Liu Ronghe, Feng Wenguang, Long Ling, et al. Experimental study on rock pore volume compressibility [J]. Oil Drilling & Production Technology, 2009, 31 (04): 79-82.). During reservoir development, as formation fluid is continuously produced, the formation pressure gradually decreases, which causes the effective overburden stress on a rock matrix increases, the reservoir is compacted, and the pore volume is reduced, resulting in further discharge of the formation fluid. Therefore, the rock pore volume compressibility is an important parameter to characterize the elastic energy of an oil and gas reservoir. In addition, the rock pore volume compressibility has an important application value in evaluating the elastic production capacity and dynamic geological reserves of an oil reservoir, and therefore, accurate measurement of the rock pore volume compressibility is of great significance in guiding the development of the oil and gas reservoir.

At present, there are mainly the following methods used to measure the rock pore volume compressibility: one is an elastic modulus method for measuring a rock pore compressibility based on rock mechanics (Chinese Patent CN114076716A); another is a brine measurement method using industry standards (SY/T 5815-2016, Measurement method for rock pore volume compressibility [S].); and the other is considering an influence of a blank volume of a core holder and a connecting pipeline thereof based on industry standards (Chinese Patent CN104374683B). In view of the above methods, there are mainly the following defects: (1) the elastic modulus method for measuring the pore compressibility is a destructive test, and the core has no use value after the experiment; (2) according to the existing industrial standards and methods, testing is performed at room temperature, and the influence of high formation temperature on the rock pore compressibility is not considered; (3) according to the existing methods, although the influence of the blank volume of the core holder and the connecting pipeline thereof is considered, the deformation of a system instrument is not considered comprehensively, and actually, since a low-permeability compact core has a low porosity, the deformation of the system instrument (including the expansion of media in a pipeline and a back pressure valve, the deformation of a rubber sleeve, the expansion of media in a gap between the rubber sleeve and the core, the expansion of hydraulic oil, and the adsorption of a clay mineral to gas at high temperature and high pressure) can seriously influence the accuracy of experimental results; and (4) the prepared brine cannot completely reduce formation water, and it is difficult to ensure the compatibility of the brine and the core; in addition, the low-permeability compact core cannot be fully and evenly saturated with brine, resulting in the rock pore volume compressibility measured by the existing methods being too large.

SUMMARY

To solve at least one of the problems, the present invention provides a gas based testing method for a pore volume compressibility of a low-permeability rock.

A specific solution of the present invention is as follows: a gas based testing method for a pore volume compressibility of a low-permeability rock comprises the following steps:

obtaining an original pore pressure of a reservoir, dropping the original pore pressure level by level, obtaining a P-V relationship curve of experimental gas after each level of pressure drop at reservoir temperature, and calculating a compressibility of the experimental gas at all levels of pore pressures according to the P-V relationship curve;

obtaining a reservoir core, measuring parameters of the reservoir core, and measuring isothermal adsorption capacity of the experimental gas in the core and isothermal desorption capacity of the experimental gas in a pressure drop process at all levels of pore pressures;

selecting a steel core with the same size as the reservoir core, drilling a through hole along an axial direction of the steel core, and measuring a through hole volume of the steel core at the reservoir temperature; meanwhile, based on a finite element method, obtaining volume deformation of the steel core at different overburden pressures; finally obtaining the through hole volume of the steel core at reservoir temperature and different overburden pressures;

based on a physical simulation experiment of depletion production, when the core is a steel core, and an overburden pressure is an initial overburden pressure of the reservoir, measuring a gas production volume of the experimental gas in the pressure drop process, and further obtaining system deformation $V_{si}=V_i-\Delta V_{N_{2i}}$, $\Delta V_{N_{2i}}=V_{G2i} \cdot C_{gi}(P_i-0.101)$, wherein $V_{si}$ represents the system deformation at the $i^{th}$-level pore pressure, $V_i$ represents the gas production volume of the experimental gas in the steel core in the $i^{th}$-level pressure drop process, $\Delta V_{N_{2i}}$ represents the deformation of the gas in the through hole at the $i^{th}$-level pore pressure, $V_{G2i}$ represents the through hole volume at the $i^{th}$-level pore pressure, $C_{gi}$ represents a compressibility of the experimental gas at the $i^{th}$-level pore pressure, and $P_i$ represents the $i^{th}$-level pore pressure;

based on a physical simulation experiment of depletion production, when the core is a reservoir core, and an overburden pressure is an initial overburden pressure of the reservoir, measuring a gas production volume of the experimental gas in the pressure drop process, and further obtaining a pore volume of the reservoir core $V_{pi}=V_{po}-V_i'+V_{si}+m\Delta V_{bi}$, wherein $V_{pi}$ represents the pore volume of the reservoir core at the $i^{th}$-level pore pressure, $V_{po}$ represents the pore volume of the reservoir core at room temperature and atmospheric pressure, $V_i'$ represents the gas production volume of the experimental gas in the reservoir core in the $i^{th}$-level pressure drop process, $\Delta V_{bi}$ represents a desorption gas volume of the experimental gas per unit mass in the pressure drop process, and m represents a weight of the reservoir core; and obtaining the pore compressibility of the reservoir rock based on the overburden pressure and the pore volumes of the reservoir core at different pore pressures.

Beneficial effects: the present invention corrects errors caused by deformation of a physical simulation device, so that the rock pore compressibility measured by experiments is more suitable for production practice, and the calculated elastic reserves of the oil reservoir are more accurate.

DESCRIPTION OF EMBODIMENTS

Figure 1:
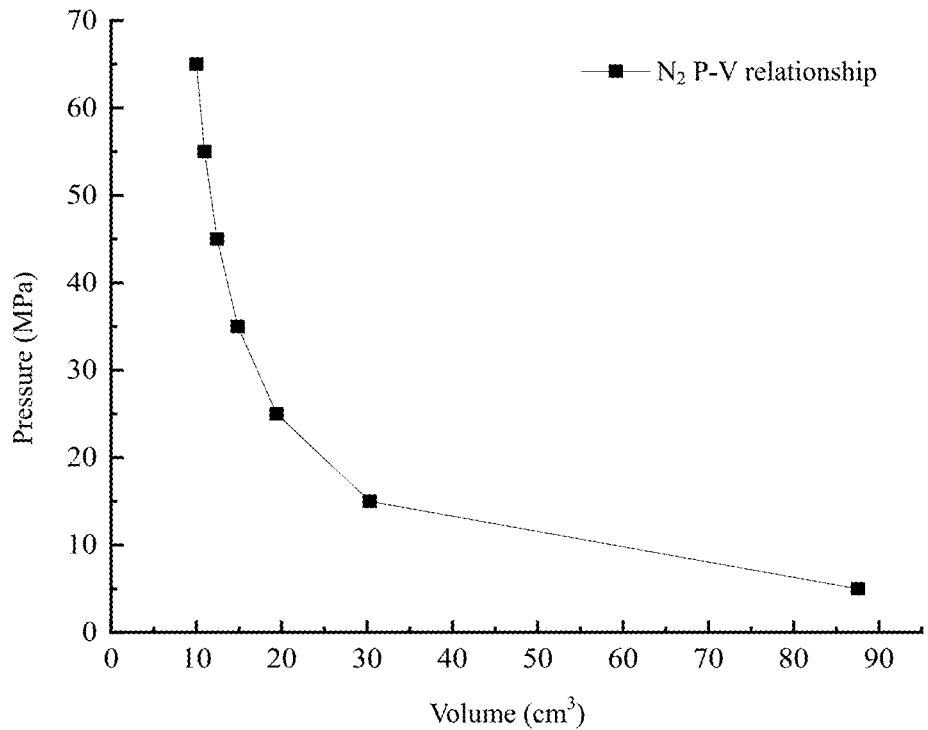
FIG. 1 is a graph of a P-V relationship curve of nitrogen according to the present invention.

The present invention is further described in detail below with reference to the embodiments and drawings; however, the embodiments of the present invention are not limited thereto.

In the following examples, an effective overburden pressure refers to a difference between an overburden pressure and a pore pressure.

A gas based testing method for a pore volume compressibility of a low-permeability rock comprises the following steps:

An original pore pressure of a reservoir is obtained, the original pore pressure is dropped level by level, a P-V relationship curve of experimental gas after each level of pressure drop at reservoir temperature is obtained, and a compressibility of the experimental gas at all levels of pore pressures according to the P-V relationship curve is calculated.

Specifically, the method of obtaining a compressibility of the experimental gas comprises the following steps:

S101: obtaining an original overburden pressure of a reservoir, an original pore pressure of a reservoir, a reservoir abandonment pressure and reservoir temperature based on original reservoir data, taking a difference between the original overburden pressure and the reservoir abandonment pressure as a maximum effective overburden pressure Pmax, and taking a difference between the original overburden pressure and the original pore pressure as a minimum effective overburden pressure Pmin; wherein in this example, for a certain block, the original overburden pressure of the reservoir is 95 MPa, the original pore pressure of the reservoir is 65 MPa, the reservoir abandonment pressure is 5 MPa, and the reservoir temperature is 70° C., and finally Pmax=90 MPa and Pmin=30 MPa are calculated.

S102: selecting N-level testing points, dropping the original pore pressure level by level, obtaining a P-V relationship curve of experimental gas at each level of pressure drop at reservoir temperature; wherein in this step, the P-V relationship curve is tested mainly with reference to GB/T 26981-2020 "Analysis Method for Reservoir Fluid Physical Properties"; a step length of the original pore pressure drop is calculated by the following formula ΔP=(Pmax−Pmin)/(N−1), wherein ΔP is the step length; and although a fixed step length such as 8 MPa may also be used, the fixed step length is generally difficult to cover a full life cycle of the reservoir from production to abandonment, and therefore, the selection of the appropriate step length by the above formula in this example is more practical.

Meanwhile, the experimental gas is required to be stable in nature, not react with the reservoir, and relatively low in cost. Therefore, in this step, the experimental gas used is nitrogen. Those skilled in the art may also use other gases base on an actual situation. For a specific number of the N-level testing points, 6 to 10 testing points are generally selected.

In this example, there are 7 testing points, the step length is 10 MPa, and therefore the pore pressures at all levels of testing points are 65 MPa, 55 MPa, 45 MPa, 35 MPa, 25 MPa, 15 MPa, and 5 MPa from large to small.

The resulting P-V relationship curve is shown in FIG. 1.

S103: calculating the compressibility of the experimental gas at all levels of pore pressures according to the P-V relationship curve; after obtaining the P-V relationship curve, calculating the compressibility of the nitrogen at all levels of pore pressures by using the following formula: $C_{gi}=1/P_i-\partial Z_i/(Z_i \partial P_i)$, wherein $C_{gi}$ represents the compressibility of nitrogen at the $i^{th}$-level pore pressure; $P_i$ represents the $i^{th}$-level pore pressure; $Z_i$ represents the compressibility factor of nitrogen at reservoir temperature and the $i^{th}$-level pore pressure; and $\partial$ is the differential symbol.

In this example, the compressibility of nitrogen at 70° C. and different pressures are finally calculated and shown in Table 1.

TABLE 1

Compressibility of nitrogen at different pressures

| Pore pressure levels | $P_i$, MPa | $C_{gi}$, MPa$^{-1}$ |
|---|---|---|
| 1 | 65 | 0.00752 |
| 2 | 55 | 0.01056 |
| 3 | 45 | 0.01494 |
| 4 | 35 | 0.02174 |
| 5 | 25 | 0.03375 |
| 6 | 15 | 0.06114 |
| 7 | 5 | 0.19545 |

A reservoir core is obtained, parameters of the reservoir core are measured, and isothermal adsorption capacity of the experimental gas in the core and isothermal desorption capacity of the experimental gas in a pressure drop process at all levels of pore pressures are measured.

Since the reservoir core is taken out of the reservoir and contains more water, oil and the like, the reservoir core needs to be cleaned to avoid interference of these materials on subsequent experiments. The reservoir core cleaning method is a conventional operation in the art, for example, after a cleaning solvent is injected, cleaning is performed by negative pressure. In this example, petroleum ether is selected as a cleaning solvent. Of course, those skilled in the art can also select other cleaning solvents base on an actual situation.

The core parameters refer to basic parameters of a reservoir core, including permeability, porosity, core length, core diameter and core weight of the reservoir core. The measurement method for these parameters is a conventional method in the art, for example, which can be performed according to the method indicated in GB/T 29172-2012 "Practices for Core Analysis". Those skilled in the art can also use other methods for measurement.

Figure 2:
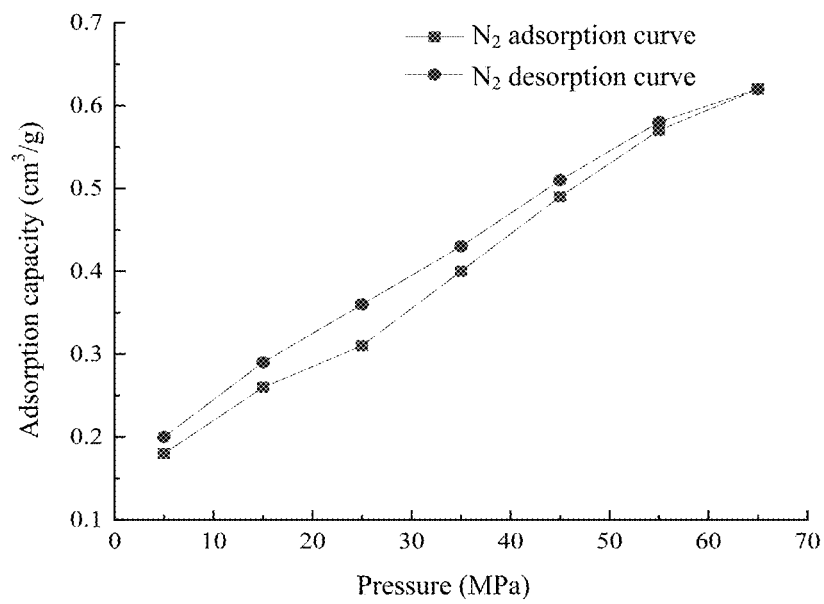
FIG. 2 is a graph of isothermal adsorption/desorption of nitrogen.

The isothermal adsorption/desorption curve is also a conventional practice in the art, such as the method disclosed in GB/T19560-2008 "Experimental Method of High-Pressure Adsorption Isothermal to Coal-Capacity Method". After the isothermal adsorption/desorption curve is obtained, the desorption gas volume $\Delta V_{bi}$ of the nitrogen after the pressure drops from the i−1$^{th}$-level pore pressure to the i$^{th}$-level pore pressure can be calculated, and the finally obtained isothermal adsorption/desorption curve is shown in FIG. 2.

In this example, the basic parameters of the selected reservoir core are as follows: the permeability is 0.95 mD, the porosity is 4.59%, the diameter is 2.54 cm, the length is 5.00 cm, and the core weight is 63.813 g.

A steel core with the same size is selected as the reservoir core, a through hole is drilled along an axial direction of the steel core, and a through hole volume of the steel core at the reservoir temperature is measured; meanwhile, based on a finite element method, volume deformation of the steel core at different effective overburden pressures is obtained; and finally the through hole volume of the steel core at reservoir temperature and different effective overburden pressures is obtained.

In this step, the steel core refers to a steel ingot having the same shape and size as the reservoir core, and may be made of relatively conventional steel materials, such as 304 stainless steel. Since the reservoir core in this example has a diameter of 2.54 cm and a length of 5.00 cm, the steel core has a diameter of 2.54 cm and a length of 5.00 cm.

The through hole of the steel core is usually set at the center of the steel core, and a diameter of the through hole is one-tenth of a diameter of the steel core. The reason why the through hole volume of the steel core at reservoir temperature needs to be measured is that the material has certain thermal expansion characteristics, and the through hole volume can be changed after the material expands. There are many methods for measuring the thermal expansion coefficient of the steel core. Generally, the measurement is performed according to the standard GB/T 4339-2008 "Testing Method for Thermal Expansion Characteristic Parameters of Metallic Materials", and after the linear expansion coefficient of the steel core is measured, the through hole volume at the reservoir temperature can be obtained.

Not only temperature will affect the deformation of the material, but pressure will also have an impact. For the reservoir, the pressure is large, and therefore the deformation caused by pressure cannot be ignored. Since it is difficult to measure the deformation of the material at the high pressure, in this example, ABAQUS commercial software is used to measure the deformation of the steel core at the effective overburden pressure based on a finite element method. The software and method are conventional software and method in the art, and details for the specific operation process are not described herein.

In this example, the through hole has a diameter of 0.254 cm, and the through hole volume is calculated to be 0.25323 cm$^3$. In this example, the effective overburden pressure is 30-90 MPa, and the deformation of the steel core at 30-90 MPa needs to be measured. Finally, the through hole volume of the steel core at different effective overburden pressures is measured, and the result is shown in Table 2. In Table 2, $P_{eobi}$ represents the effective overburden pressure at the i$^{th}$-level pore pressure.

TABLE 2

Through hole volume and deformation at different effective overburden pressures

| Pore pressure levels | $P_{eobi}$, MPa | Through hole volume, cm$^3$ | Deformation of through hole volume, cm$^3$ |
|---|---|---|---|
| 1 | 30 | 0.25046 | 0.00276 |
| 2 | 40 | 0.25012 | 0.00311 |
| 3 | 50 | 0.24978 | 0.00345 |
| 4 | 60 | 0.24944 | 0.00379 |
| 5 | 70 | 0.24909 | 0.00413 |
| 6 | 80 | 0.24875 | 0.00447 |
| 7 | 90 | 0.24841 | 0.00481 |

Based on a physical simulation experiment of depletion production, when the core is a steel core, and an overburden pressure is an initial overburden pressure of the reservoir, a gas production volume of the experimental gas in the pressure drop process is measured, and system deformation $V_{si}=V_i-\Delta V_{N_{2i}}$, $\Delta V_{N_{2i}}=V_{G_{2i}} \cdot C_{gi}$ ($P_i$−0.101) is further obtained, wherein $V_{si}$ represents the system deformation at the i$^{th}$-level pore pressure, $V_i$ represents the gas production volume of the experimental gas in the steel core in the i$^{th}$-level pressure drop process, $\Delta V_{N_{2i}}$ represents the deformation of the gas in the through hole at the i$^{th}$-level pore pressure, $V_{G_{2i}}$ represents the through hole volume at the i$^{th}$-level pore pressure, $C_{gi}$ represents a compressibility of the experimental gas at the i$^{th}$-level pore pressure, and $P_i$ represents the i$^{th}$-level pore pressure.

In this step, the system deformation refers to the deformation of the experimental device at the reservoir pressure and temperature, including expansion of experimental media in a pipeline and a back pressure valve in the experimental device, deformation of a rubber sleeve, expansion of hydraulic oil, and the like. The core usually has a smaller pore volume, and the deformation at reservoir pressure and temperature is even smaller (see Table 4); therefore, the influence of the deformation of the experimental device on the final experimental result cannot be ignored, and if the deformation is not eliminated, the final obtained result has a larger error. Therefore, the deformation of the experimental device is calculated by the foregoing operation in this example of the present invention, the accurate deformation of the core pore can be obtained after the deformation is deducted, and compared with the prior art, the final result is more accurate.

In this step, the physical simulation experiment of depletion production comprises the following steps: at the reservoir temperature, firstly establishing initial confining pressure, then increasing the confining pressure and the outlet pressure of the core holder at the same pressurizing speed until the outlet pressure of the core holder reaches the original pore pressure, and then continuously increasing the confining pressure to reach the original overburden pressure of the reservoir; sequentially setting the outlet pressure of the core holder to be all levels of pore pressures from large to small, and obtaining the total gas volume produced during each level of pore pressure drop until the pore pressure reaches the reservoir abandonment pressure.

In this step, the physical simulation experiment device for depletion production used comprises a booster pump, a core holder, a back pressure valve, and a gas metering device connected in sequence, the core holder is further connected to a confining pressure pump, wherein the booster pump and the back pressure valve are used to control the pressure of the core inside the core holder, and the confining pressure pump is used to control the confining pressure of core holder, and gas metering device is used to measure the produced gas volume. The structure and connection relationship of the device are conventional in the art. Details are not described herein.

Meanwhile, referring to the definition of the overburden pressure and the pore pressure, in this example, the confining pressure is regarded as the overburden pressure, the outlet pressure of the core holder is regarded as the pore pressure, and the difference between the confining pressure and the pore pressure is regarded as the effective overburden pressure, so that the overburden pressure and the pore pressure can be simulated conveniently.

The final measured system deformation is shown in Table 3.

TABLE 3

System deformation

| Pore pressure levels | $P_i$, MPa | $V_i$, cm³ | $\Delta V_{N_{2i}}$, cm³ | $V_{si}$, cm³ |
| --- | --- | --- | --- | --- |
| 1 | 65 | 0.165 | 0.12220 | 0.04280 |
| 2 | 55 | 0.184 | 0.14495 | 0.03905 |
| 3 | 45 | 0.203 | 0.16750 | 0.03550 |
| 4 | 35 | 0.305 | 0.18923 | 0.11577 |
| 5 | 25 | 0.251 | 0.20932 | 0.04168 |
| 6 | 15 | 0.276 | 0.22661 | 0.04939 |
| 7 | 5 | 0.295 | 0.23785 | 0.05715 |

Based on a physical simulation experiment of depletion production, when the core is a reservoir core, and an overburden pressure is an initial overburden pressure of the reservoir, a gas production volume of the experimental gas in the pressure drop process is measured, and a pore volume of the reservoir core $V_{pi}=V_{po}-V_i'+V_{si}+m\Delta V_{bi}$ is further obtained, wherein $V_{pi}$ represents the pore volume of the reservoir core at the $i^{th}$-level pore pressure, $V_{po}$ represents the pore volume of the reservoir core at room temperature and atmospheric pressure, $V_i'$ represents the gas production volume of the experimental gas in the reservoir core in the $i^{th}$-level pressure drop process, $\Delta V_{bi}$ represents a desorption gas volume of the experimental gas per unit mass in the pressure drop process, and m represents a weight of the reservoir core.

In this step, the used physical simulation experiment device for depletion production and physical simulation experiment of depletion production are the same as those in the previous step, and only the difference is that the steel core is replaced by the reservoir core. The final measured results are shown in Table 4.

TABLE 4

Results of pore volume of reservoir core

| Pore pressure levels | $P_{eobi}$, MPa | $m\Delta V_{bi}$, cm³ | $V_i'$, cm³ | $V_{pi}$, cm³ |
| --- | --- | --- | --- | --- |
| 1 | 30 | / | / | / |
| 2 | 40 | 2.55251 | 2.755 | 0.99919 |
| 3 | 50 | 4.46689 | 4.666 | 0.99902 |
| 4 | 60 | 5.10502 | 5.384 | 0.99887 |
| 5 | 70 | 4.46689 | 4.672 | 0.99873 |
| 6 | 80 | 5.10502 | 5.318 | 0.99860 |
| 7 | 90 | 5.74315 | 5.964 | 0.99847 |

The pore compressibility of the reservoir rock is obtained based on the overburden pressure and the pore volumes of the reservoir core at different pore pressures.

Figure 3:
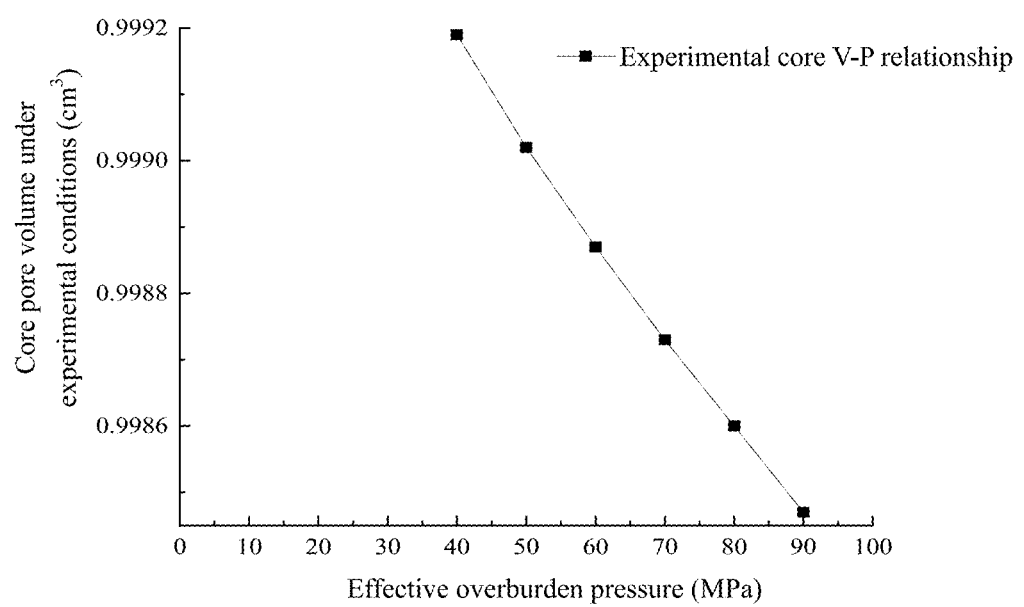
FIG. 3 is a fit plot of overburden pressure and pore volume.

In this step, a curve is plotted and fitted by taking the effective overburden pressure $P_{eob}$ as an x-axis and taking the pore volume $V_p$ as a y-axis, as shown in FIG. 3, and the pore compressibility of the reservoir rock is calculated according to the following formula: $C_p=-y\partial V_p/V_p\partial P_{eob}$, wherein $C_p$, refers to a rock pore compressibility, $V_p$ refers to experimental core pore volume, and y represents volume strain conversion coefficient. In this example, y is 0.619, and the final results are shown in Table 5.

TABLE 5

Rock pore compressibility

| Pore pressure levels | $C_p$, MPa⁻¹ |
| --- | --- |
| 1 | / |
| 2 | 1.25657 × 10⁻⁵ |
| 3 | 1.21324 × 10⁻⁵ |
| 4 | 1.16991 × 10⁻⁵ |
| 5 | 1.12039 × 10⁻⁵ |
| 6 | 1.08325 × 10⁻⁵ |
| 7 | 1.0523 × 10⁻⁵ |

The above descriptions are merely preferred specific embodiments of the present invention, however, the protection scope of the present invention is not limited thereto, and any modifications and substitutions that can be easily conceived by those skilled in the art within the technical scope disclosed by examples of the present invention shall fall within the protection scope of the present invention.

What is claimed is:

1. A gas based testing method for a pore volume compressibility of a low-permeability rock, comprising the following steps:

obtaining an original pore pressure of a reservoir, dropping the original pore pressure level by level, obtaining a P-V relationship curve of experimental gas after each level of pressure drop at reservoir temperature, and calculating a compressibility of the experimental gas at all levels of pore pressures according to the P-V relationship curve: wherein the compressibility of the experimental gas is $C_{gi}=1/P_i-\partial Z_i/(Z_i\partial P_i)$, $C_{gi}$ represents the compressibility of the experimental gas at the $i^{th}$-level pore pressure: $P_i$ represents the $i^{th}$-level pore pressure: $Z_i$ represents the compressibility factor of the experimental gas at reservoir temperature and the $i^{th}$-level pore pressure; and $\partial$ is the differential symbol;

obtaining a reservoir core, measuring parameters of the reservoir core, and measuring isothermal adsorption capacity of the experimental gas in the core and isothermal desorption capacity of the experimental gas in a pressure drop process at all levels of pore pressures;

selecting a steel core with the same size as the reservoir core, drilling a through hole along an axial direction of the steel core, and measuring a through hole volume of the steel core at the reservoir temperature; meanwhile, based on a finite element method, obtaining volume deformation of the steel core at different overburden pressures; finally obtaining the through hole volume of the steel core at reservoir temperature and different overburden pressures;

based on a physical simulation experiment of depletion production, when the core is a steel core, and an overburden pressure is an initial overburden pressure of the reservoir, measuring a gas production volume of the experimental gas in the pressure drop process, and further obtaining system deformation $V_{si}=V_i-\Delta V_{N_{2i}}$, $\Delta V_{N_{2i}}=V_{G2i}\cdot C_{gi}(P_i-0.101)$, wherein $V_{si}$ represents the system deformation at the $i^{th}$-level pore pressure, $V_i$ represents the gas production volume of the experimental gas in the steel core in the $i^{th}$-level pressure drop process, $\Delta V_{N_{2i}}$ represents the deformation of the gas in the through hole at the $i^{th}$-level pore pressure, $V_{G2i}$ represents the through hole volume at the $i^{th}$-level pore pressure, and $P_i$ represents the $i^{th}$-level pore pressure;

based on a physical simulation experiment of depletion production, when the core is a reservoir core, and an overburden pressure is an initial overburden pressure of the reservoir, measuring a gas production volume of the experimental gas in the pressure drop process, and further obtaining a pore volume of the reservoir core $V_{pi}=V_{po}-V_i'+V_{si}+m\Delta V_{bi}$, wherein $V_{pi}$ represents the pore volume of the reservoir core at the $i^{th}$-level pore pressure, $V_{po}$ represents the pore volume of the reservoir core at room temperature and atmospheric pressure, $V_i$ represents the gas production volume of the experimental gas in the reservoir core in the $i^{th}$-level pressure drop process, $\Delta V_{bi}$ represents a desorption gas volume of the experimental gas per unit mass in the pressure drop process, and m represents a weight of the reservoir core; and obtaining the pore compressibility of the reservoir rock based on the overburden pressure and the pore volumes of the reservoir core at different pore pressures: $C_p = -\gamma \partial V_p / V_p \partial P_{eob}$, wherein $C_{p'}$ refers to rock pore compressibility: $V_{p'}$ refers to experimental core pore volume, $\gamma$ represents volume strain conversion coefficient, and $P_{eob}$ represents effective overburden pressure.

2. The method according to claim 1, wherein the method of obtaining a compressibility of the experimental gas comprises the following steps:

S101: obtaining an original overburden pressure of a reservoir, an original pore pressure of a reservoir, a reservoir abandonment pressure and reservoir temperature based on original reservoir data, taking a difference between the original overburden pressure and the reservoir abandonment pressure as a maximum effective overburden pressure $P_{max}$, and taking a difference between the original overburden pressure and the original pore pressure as a minimum effective overburden pressure $P_{min}$;

S102: selecting N-level testing points, dropping the original pore pressure level by level, obtaining a P-V relationship curve of experimental gas at each level of pressure drop at reservoir temperature; and S103: calculating the compressibility of the experimental gas at all levels of pore pressures according to the P-V relationship curve.

3. The method according to claim 2, wherein a step length of the original pore pressure drop is $\Delta P=(P_{max}-P_{min})/(N-1)$.

4. The method according to claim 1, wherein the parameters of the reservoir core comprise permeability, porosity; core length, core diameter, and core weight.

5. The method according to claim 1, wherein the through hole is provided at a center of the steel core, and the through hole has a diameter less than that of the steel core.

6. The method according to claim 1, wherein the through hole volume of the steel core at the reservoir temperature is obtained based on a thermal expansion coefficient of a metal material.

7. The method according to claim 1, wherein the physical simulation experiment of depletion production is performed by using a physical simulation experiment device for depletion production, the physical simulation experiment device for depletion production comprises a booster pump, a core holder, a back pressure valve, and a gas metering device connected in sequence, and the core holder is further connected to a confining pressure pump.

8. The method according to claim 7, wherein during the physical simulation experiment of depletion production, the overburden pressure is simulated by the confining pressure, and the pore pressure is simulated by the outlet pressure of the core holder.

9. The method according to claim 7, wherein the physical simulation experiment of depletion production comprises the following steps: at the reservoir temperature, firstly establishing initial confining pressure, then increasing the confining pressure and the outlet pressure of the core holder at the same pressurizing speed until the outlet pressure of the core holder reaches the original pore pressure, and then continuously increasing the confining pressure to reach the original overburden pressure of the reservoir; sequentially setting the outlet pressure of the core holder to be all levels of pore pressures from large to small, and obtaining the total gas volume produced during each level of pore pressure drop until the pore pressure reaches the reservoir abandonment pressure.

* * * * *